Sept. 18, 1934. E. JANOVITCH 1,974,275
ELECTRIC TESTING DEVICE
Filed March 16, 1932 2 Sheets-Sheet 1

INVENTOR
EUGENE JANOVITCH
BY
Warren S Orton
ATTORNEY

Sept. 18, 1934.   E. JANOVITCH   1,974,275
ELECTRIC TESTING DEVICE
Filed March 16, 1932   2 Sheets-Sheet 2

INVENTOR
EUGENE JANOVITCH
BY
Warren S. Orton
ATTORNEY

Patented Sept. 18, 1934

1,974,275

UNITED STATES PATENT OFFICE 1,974,275

ELECTRIC TESTING DEVICE

Eugene Janovitch, Astoria, N. Y., assignor of one-half to Edward G. Strobach, New York, N. Y.

Application March 16, 1932, Serial No. 599,091

11 Claims. (Cl. 175—183)

The invention relates in general to an improved form of testing device for use in determining the operativeness of electric devices and for locating breaks in metal and other electric conductive materials. The invention specifically relates to an easily portable testing device particularly designed for use in automobile repair shops for testing for breaks in condensers and distributors in automotive power plants.

The primary object of the invention is to provide a simplified form of portable testing device which can be used selectively either to test electrical devices such as condensers or, by a simple replacement of connecting jacks, to test other types of electrical instruments such as distributors.

The invention also features a form of testing device by means of which the time duration of the passage of a high tension current through the devices being tested may be controlled to fit the testing requirements of the particular device under test, such for instance as to provide a momentary impulse when a device of a type of a condenser is under test and to provide for any desired time duration for testing devices like a distributor where any break in the device under test discloses itself by the presence of a spark gap illuminating the breaks.

Various other objects and advantages of the invention will be in part obvious from an inspection of the accompanying drawing and in part will be more fully set forth in the following particular description of one form of mechanism embodying the invention, and the invention also consists in certain new and novel features of construction and combination of parts hereinafter set forth and claimed.

Figure 2:
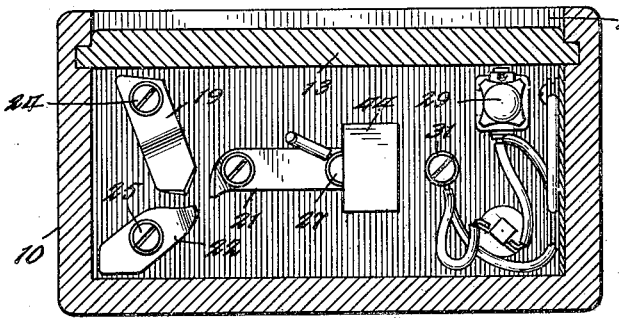
Fig. 2 is a horizontal sectional view taken through the casing shown in Fig. 3 and taken on the line 2—2 to show the parts carried on the underside of the top wall.
Figure 3:
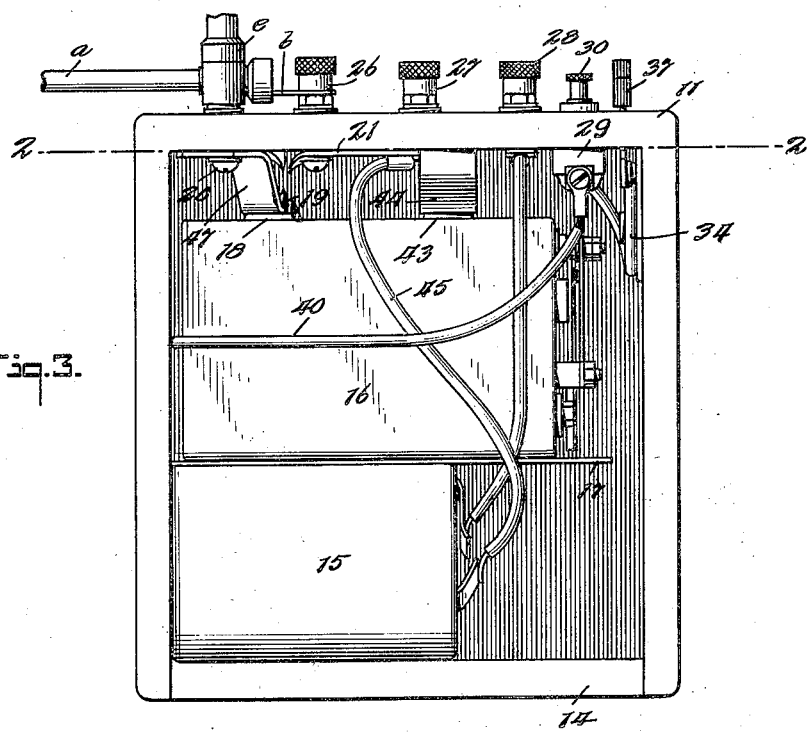
Fig. 3 is a view in side elevation of the testing device with the side cover shown in Fig. 2 removed to open the casing and expose its contents.
Figure 4:
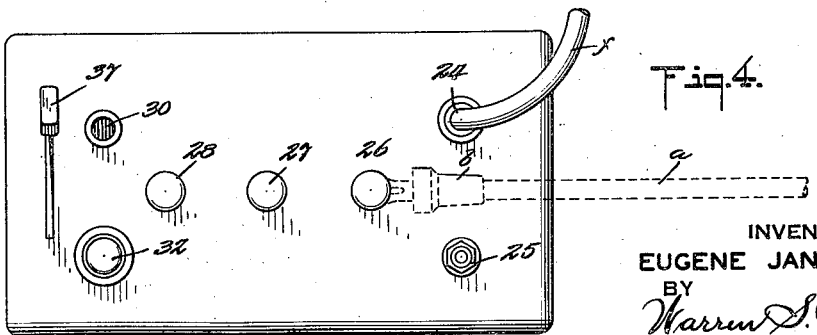
Fig. 4 is a plan view looking down upon the top of the casing shown in Fig. 3.

It is a feature of this disclosure that the invention constitutes a readily portable test box which can be carried from place to place by the operator in testing different devices, as for instance in testing the distributors and condensers in different automobiles. Referring particularly to the showing in Figs. 2 to 4, there is disclosed a rectangular container 10 of somewhat conventional design provided with a top wall 11. Access to the interior of the casing is provided through an open side 12 normally closed by a vertically sliding gate or door 13. Positioned on the bottom wall 14 of the casing is a six-volt, four cell electric battery 15 supporting a vibratory coil 16 insulated from the battery 15 by a strip of fabric insulation 17, the parts being so proportioned that the high tension button 18 on the coil 16 will be maintained in firm bearing engagement with a high potential gap forming bar 19 secured by screw 20 to the underside of wall 11. The bar 19 being slightly resilient insures the maintenance of contact between itself and button 18 when the battery 15 has been forced into position on the bottom wall 14. In addition to the bar 19 there is secured to the underside of the top wall 11 two other bars which for the purpose of distinction will be identified hereinafter as a low potential or safety point bar 21 and a gap bar 22. These bars are provided with pointed ends arranged in juxtaposition to form a three point spark gap 23. Positioned on top of the wall 11 and conveniently located at one end of the top of the casing are two upstanding male type plugs, one of which 24 is connected electrically to the bar 19 and will be identified hereinafter as the high potential plug. The other plug 25 is connected electrically through the top 11 to the gap bar 22 and will be identified hereinafter as the gap plug.

Positioned on top of the box are three other plugs or binding posts, one of which marked 26 is connected electrically to the low potential bar 21 adjacent its pointed end and the other marked 27 is likewise secured to this bar. The third plug or binding post 28 is idle in the showing of the invention disclosed herein, where the battery 15 constitutes the source of electric energy, but it is to be understood that the binding post 28 provides a means for connecting the device to an external source of electric energy of suitable voltage in the absence of the battery 15.

There is provided three circuit closers or switches contained for the most part within the casing 10 and each provided with an actuating control element projected through the top wall 11 and disposed on the right hand side of the box and convenient for manual manipulation selectively as desired. These switches include a main circuit controlling switch 29 of the push and pull type provided with an upstanding actuating stem 30 and designed to constitute a safety switch. In this switch, the control 30 is frictionally held in both its on or off positions and is moved into off position so as to prevent an unnecessary discharging of the battery when the device is not in use. Another of the circuit closers 31 is of the normally open circuit push button type and includes an actuating push button 32 normally held in its circuit breaking position by the usual spring 33. This push button type of circuit closer 31 is designed to connect one side of the battery with the coil 16 to energize the coil for any desired duration of time controlled by the pressing on the button 32.

The third circuit closer 34 is of momentary contact type and includes two contact plates 35 and 36 adapted to be bridged by a lever 37 hereinafter referred to as a condenser lever, as it moves past the gap 38 between the plates 35 and 36.

A low tension conductor 40 leads from one end of the primary of coil 16 to one side of the battery 15. The conductor 40 includes switch 29. The conductor is split between switch 29 and the battery to provide two paths; one identified by the conductor 41 which contains the long duration, distributor circuit closer 31 and the other identified by the conductor 42 which contains the short duration, condenser circuit closer 34.

The low tension button 43 on coil 16 is connected to low potential plate and safety point 21 through spring contact plate 44 and conductor 45 to the other side of the battery 15. The high tension button 18 on the coil 16 is engaged by a down turned portion 47 of plate 19 which thus provides direct contact with the high potential plug 24.

The device is provided with the necessary jacks or flexible connectors making connection between the condenser, distributor, or other device to be tested, and the appropriate plugs and binding posts on the instrument. To show a convenient means for making the connection with, say, the condenser shown in Fig. 1, a flexible jack $a$ is provided having at one end a prong $b$ adapted to be engaged with the plug or binding post 26 and provided at its opposite end with spring clamping jaw $c$ adapted to engage the L-contact on the side of the condenser. There is also disclosed in Fig. 1, a flexible jack $f$ provided at one end with nipple $e$ for telescoping over the top of upstanding plug 25. The opposite end of jack $f$ is provided with a pointed L-shaped contact $d$ adapted to engage in the ring at the end of the flexible connector extending from the condenser.

When it is desired to use the connection to test the distributor, the contact $d$ is removed from the jack $f$ and placed between the jaws of the clamp $c$. The nipple $e$ is removed from the plug 25, inserted on the plug 24 with the opposite end intruded into the central contact aperture in the distributor.

Figure 1:
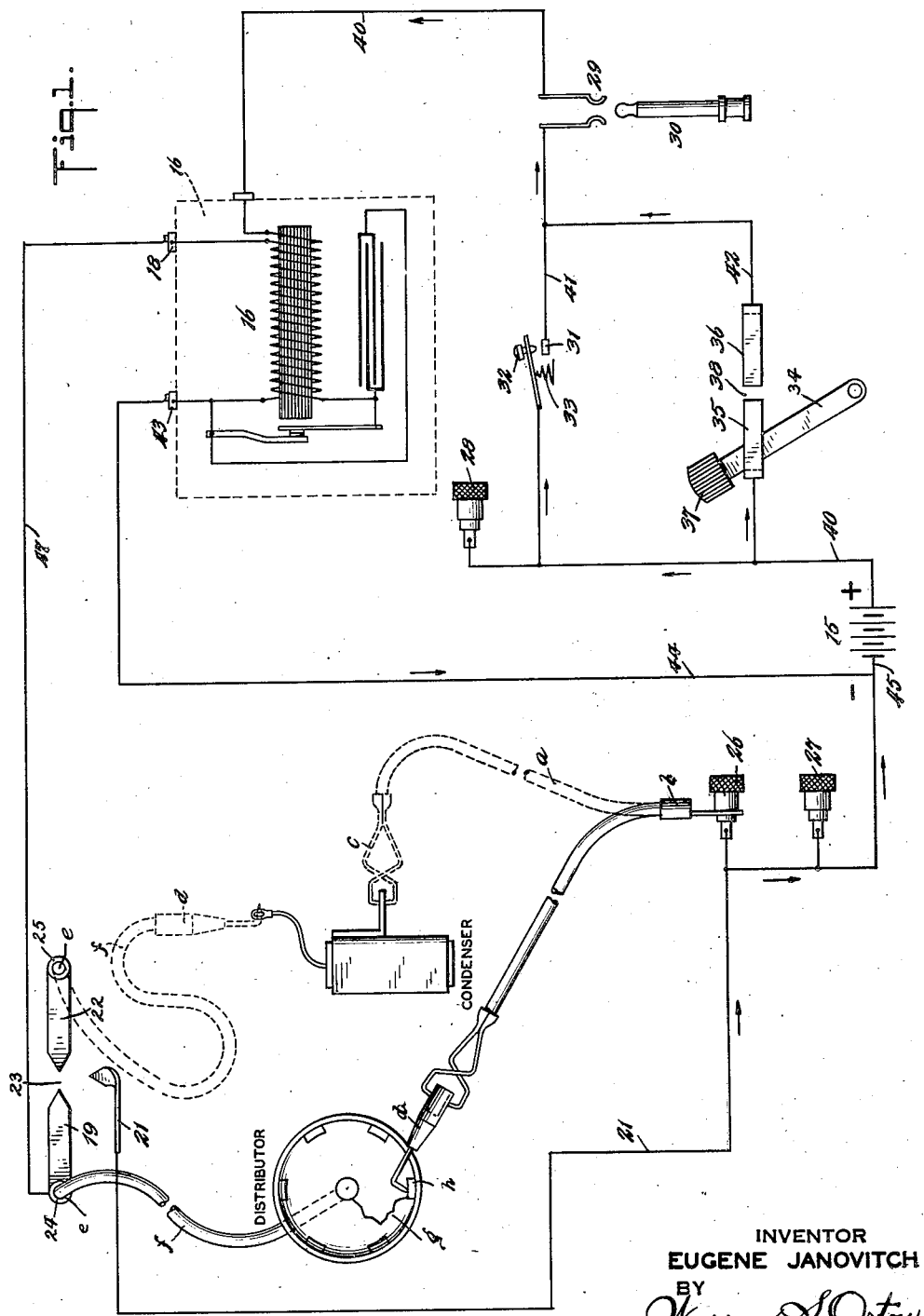
Fig. 1 is a view largely diagrammatic showing the electric circuit of a preferred embodiment of the invention and showing in full and dotted outline attachments for use in connection with two types of devices which can be tested by the testing device.

In operation, and let it be assumed that it is desired to test the condenser to ascertain whether it is in working condition, the condenser is inserted in circuit between the plugs 25 and 26; the jaw $c$ clamping the condenser contact and the pointed end of contact $e$ providing a convenient connection with the flexible eye contact of the condenser, as suggested at the left center of Fig. 1. The primary circuit through the coil is first prepared for its momentary closing by moving the control 30 into position to close the switch 29 as long as the device is being used. The operator then moves the condenser lever 37 from one to the other of its extreme positions with a more or less quick movement. During an instant of time lever 37 will bridge gap 38 and close the circuit from plates 35 and 36. During this instant of time that the circuit is thus closed through both switches 34 and 29, high tension from the coil will cause a spark to jump across the gap 23 between the bars 19 and 22, in the event that the condenser is in good working condition. This of course, charges the condenser and it may be tested to determine its charged condition by discharging it through any suitable ground; the jump spark between the condenser and ground showing that it was charged and in good condition. In the event the condenser is not in proper condition to function as such and interposes a resistance to the passage of current between plugs 25 and 26, the charge of high tension accumulated in the bar 19 will jump across to the safety point provided by the low potential bar 21 and the circuit is completed therethrough back to the battery. It is thus seen that a spark jump between 19 and 22 will indicate that the condenser is good while a spark jump between 19 and 21 will indicate that the condenser is imperfect.

In the event that it is desired to test a form of apparatus, such for instance as the distributor illustrated, for any part designed to provide part of an electric circuit, such as the engine head, the part to be tested is positioned between the plugs 24 and 26 as suggested at the extreme left side of Fig. 1. Let it be assumed that there is a crack at $g$ in the distributor head. By means of the testing device herein featured, this crack will show as a line of color of a bright red contrasting vividly with the distributor base when the switches 29 and 31 are closed and the end $d$ of the jack $a$ brought into contact with one of the spark plug contact posts as shown at $h$ in the distributor.

In this case, any break in the distributor itself acts as the spark gap in the high tension circuit and which spark gap has to be provided in the instrument itself in the case of the condenser test in which any breaks in the condenser would not be visible.

While the invention has been described in connection with the testing of a device where the crack is visible, as in the case of a distributor, or invisible as in the case of the condenser, the testing device herein disclosed may be equally applicable to test for breaks or circuit breaking interruptions in any character of article or material, provided simply that the material under test be of sufficient conducting characteristics so as to carry the high tension current generated by the coil of the instrument.

It is understood that when the device is used with an internal source of energy, as with a house circuit connected at the binding post 28, the negative side of the system is grounded at 45. In this case of course, the binding posts 26, 27 and safety point bar 21 are likewise grounded and in the following claims where reference is made to the negative side of the battery or other source, the limitation is to be regarded as if it referred to the grounded side of the system.

I claim:

1. A device for testing for electric breaks in condensers and distributors of automotive vehicles, comprising a portable container provided with three contact plugs exposed on the outer side, one of said plugs constituting a low potential plug, another a high potential plug and the third a gap plug, means for selectively biasing the condensers or distributors to be tested between the negative side of the source and either the high potential plug or the gap plug, said container also provided with three circuit closers each having their actuating control element exposed on the outer side of the container and accessible for convenient selective manipulation, three pointed bars secured to the container within the same and disposed with their pointed ends in juxtaposition to form a three point spark gap, one of the bars secured electrically to the high potential plug, another bar being secured electrically to the gap plug, and the third bar being connected to low potential plug, means within the container for forming a primary vibration coil circuit, said means including a source of electric energy, a vibratory coil having one end of its primary connected through a split low tension conductor leading to the positive side of the source, one of said circuit closers contained in said conductor and constituting a main safety switch, the part of the conductor between said safety switch and the source being split and providing two paths, between the same and the positive side of the source, each containing another of said circuit closers, one providing for a momentary closing of the primary circuit when its control element is actuated with the safety switch closed, and the other providing similarly for a closing of the primary circuit for any desired period of time with the safety switch closed, one end of the secondary of said coil being connected electrically to the negative side of the source, and its other end constituting a source of high tension current connected electrically to said high potential plug, and a return conductor connecting the negative side of the source with the low potential plug.

2. A device for testing for electric breaks in condensers and distributors of automotive vehicles, comprising a portable container provided with three contact plugs exposed on the outer side, one of said plugs constituting a low potential plug, another a high potential plug and the third a gap plug, means for selectively biasing the condensers or distributors to be tested between the negative side of the source and either the high potential plug or the gap plug, said container also provided with three circuit closers, three pointed bars secured to the container within the same and disposed with their pointed ends in juxtaposition to form a three point spark gap, one of the bars secured electrically to the high potential plug, and another bar being secured electrically to the gap plug, and the third bar being connected to the low potential plug, means within the container for forming a primary circuit, said means including a source of electric energy, a vibratory coil having one end of its primary connected through a split low tension conductor leading to one side of the source, one of said circuit closers contained in said conductor and constituting a safety switch, the part of the conductor between said safety switch and the source being split and providing two paths, each containing another of said circuit closers, one of said circuit closers being of the momentary contact type and the other being of a type which can be closed for any duration of time, one end of the secondary of said coil being connected electrically to the other side of the source, and its other end connected electrically to said high potential plug, and a return conductor connecting said other side of the source with the low potential plug.

3. A device for testing for breaks in condensers of the type used in automotive vehicles, comprising a container provided with a low potential binding post and a gap plug and said post and plug arranged to have the condenser to be tested disposed between them, two pointed bars secured to the container to form a spark gap, one of said bars secured electrically to the gap plug and the other forming a high potential bar, means forming a primary circuit including a source of electric energy, a vibratory coil, a low tension conductor connecting one end of its primary with one side of the source, a circuit closer and a main switch in said conductor, a high tension conductor connecting the secondary of the coil with said high potential bar, said main switch adapted to be set in position to set the circuit in position to be closed by the subsequent action of said circuit closer and said circuit closer being of a type to close the circuit momentarily through the coil, and a return conductor connecting the low potential plug with the other side of the source.

4. A device for testing for breaks in distributors of the type used in automotive vehicles, comprising a container provided with a low potential plug and with a high potential plug, means forming a test circuit and including the distributor to be tested, said means electrically connecting the plugs, means forming the primary circuit of a vibratory coil including a source of electric energy, a vibratory coil, a low tension conductor connecting one end of its primary with one side of the source, a manually controlled circuit closer in said conductor, a high tension conductor connecting the secondary of the coil with said high potential plug and a return conductor permanently connecting said low potential plug with the other side of the source.

5. A device for testing electric instruments, comprising a container provided with a low potential contact and with a high potential contact, means for positioning the device to be tested therebetween two bars coacting to form a spark gap, one of the bars secured to the high tension contact, means forming a primary circuit including a source of electric energy, a vibratory coil, a low tension conductor connecting one end of its primary with one side of the source, a manually controlled circuit closer in said conductor, a high tension conductor connecting the secondary of the coil with said high potential contact and a return conductor fixedly connecting both the other bar and said low potential contact with the other side of the source.

6. In a device of the class described, the combination of means forming an electric circuit comprising a source of electric energy, a vibratory coil and a control for the circuit, said control including a main switch, the circuit between said main switch and adjacent side of the battery providing two paths, an open circuit push button type of circuit closer in one path and a circuit closer of the momentary acting type in the other path, three plates coacting to provide a three way spark gap, one of the plates electrically connected to the high tension source of the coil, the second plate connected electrically to the side of said source opposite to the side provided with the control, and the third plate being normally disconnected from the source, and each of said plates provided with means to which devices to be tested can be electrically connected.

7. In a device of the class described, the combination of means forming an electric circuit comprising a source of electric energy, a vibratory coil and a control switch for the circuit, three plates coacting to provide a three way spark gap, one of the plates electrically connected to the high tension source of the coil, the second plate connected electrically to one side of said source, and the third plate being normally disconnected from the source, and each of said plates provided with binding posts and means forming a testing circuit including a pair of flexible jacks with one connected electrically to the side of the source to which said second plate is connected and the other jack provided with means for connection selectively with either of the two binding posts connected to the first and second named plates whereby the testing circuit may be formed selectively between the side of the battery to which the second plate is connected and either of the first or third plates.

8. In a device for testing electric instruments, the combination of three plates coacting to form a triangular three point spark gap, a source of electric energy, means forming a battery circuit and including said source, a main control switch and a vibratory coil for supplying one of said plates with high tension current, manually actuated means in said battery circuit and operable when the main circuit is closed for controlling the time duration of the passage of high tension current to said plate and another of the plates connected electrically to the negative side of the source and the third plate being normally free of the source and each plate provided with means for connecting the same to the instrument to be tested whereby the instrument to be tested may be disposed selectively between the negative side of the source and either the high tension current plate or the normally free third plate.

9. In a device for testing condensers and the like, the combination of a source of electric energy, means including said source and a vibratory coil forming a source of high tension current, a main switch between the source and said means, a pair of plates coacting to form a spark gap, one of the plates connected to receive high tension current from the coil, the other plate provided with a binding post and normally disconnected from the source, means for connecting the condenser to be tested in circuit between said binding post, and the negative side of said source and manually controlled circuit closing means between the source and coil operable when the main switch is closed for causing a short time duration of the high tension current passed through the condenser under test.

10. In an easily portable and self-contained device for testing breaks in distributor heads and faults in the dielectric of condensers, the combination of a source of electric energy, a low point safety bar and a high potential bar coacting to constitute a means forming a spark gap, means including said source and a vibratory coil for generating high tension current, a main switch and a normally open switch between the positive side of the source and coil, one point of said gap connected to the negative side of the source and the other point connected to the coil to receive said high tension current, and means including flexible jacks between said high potential bar and the negative side of the source and containing the device to be tested.

11. In a device for testing devices for cracks and breaks, the combination of a source of electric energy, a low point safety bar and a high potential bar coacting to constitute a means forming a spark gap, means including said source and a vibratory coil for generating high tension current, one point of said gap connected permanently to the negative side of the source and the other point connected to the coil to receive said high tension current, and means for connecting the device to be tested between said high potential bar and the negative side of the source and manually controlled means in the circuit containing the source and coil for setting the circuit and for controlling the time duration of the current passing through the device being tested when the circuit has been so set.

EUGENE JANOVITCH.